US008830578B2

(12) United States Patent
Akashi et al.

(10) Patent No.: US 8,830,578 B2
(45) Date of Patent: Sep. 9, 2014

(54) OPTICAL ISOLATOR ELEMENT AND OPTICAL MODULE USING THE SAME

(75) Inventors: Tomoyoshi Akashi, Kitami (JP); Kaichirou Nakashima, Kitami (JP); Michifumi Shouda, Kitami (JP)

(73) Assignee: Kyocera Corporation, Kyoto (JP)

( * ) Notice: Subject to any disclaimer, the term of this patent is extended or adjusted under 35 U.S.C. 154(b) by 444 days.

(21) Appl. No.: 13/259,133

(22) PCT Filed: Mar. 19, 2010

(86) PCT No.: PCT/JP2010/054849
§ 371 (c)(1),
(2), (4) Date: Nov. 30, 2011

(87) PCT Pub. No.: WO2010/110219
PCT Pub. Date: Sep. 30, 2010

(65) Prior Publication Data
US 2012/0134021 A1    May 31, 2012

(30) Foreign Application Priority Data

Mar. 25, 2009 (JP) ................................. 2009-073637
Oct. 29, 2009 (JP) ................................. 2009-249355

(51) Int. Cl.
*G02B 5/30* (2006.01)
*G02F 1/09* (2006.01)

(52) U.S. Cl.
CPC ...................................... *G02F 1/093* (2013.01)
USPC ................. 359/484.03; 359/487.06

(58) Field of Classification Search
None
See application file for complete search history.

(56) References Cited

U.S. PATENT DOCUMENTS

| 5,864,427 | A  | * | 1/1999  | Fukano et al. ............ 359/487.06 |
| 5,886,820 | A  | * | 3/1999  | Tajima et al. ............ 359/487.06 |
| 5,999,315 | A  | * | 12/1999 | Fukano et al. ............ 359/484.03 |
| 6,313,947 | B1 | * | 11/2001 | Takahashi et al. ........ 359/485.03 |
| 6,563,639 | B1 | * | 5/2003  | Borrelli et al. ............ 359/484.03 |
| 6,806,990 | B2 | * | 10/2004 | Yoshikawa et al. .......... 359/281 |
| 7,961,394 | B2 | * | 6/2011  | Yoneda et al. ............ 359/487.06 |

FOREIGN PATENT DOCUMENTS

| JP | 08-050205    | 2/1996  |
| JP | 09-178939    | 7/1997  |
| JP | 2000-284226  | 10/2000 |
| JP | 2001-051235  | 2/2001  |
| JP | 2006-208710  | 8/2006  |
| JP | 2006-284769  | 10/2006 |
| jp | 2008-299329  | 12/2008 |

* cited by examiner

*Primary Examiner* — Derek S Chapel
(74) *Attorney, Agent, or Firm* — DLA Piper LLP (US)

(57) ABSTRACT

An optical isolator 1 element comprises a Faraday rotator 11 that rotates a polarization plane of light; a first polarizer of optical absorption type 12 arranged on one surface side of the Faraday rotator 11, the first polarizer 12 having a layer in which metal particles are distributed; and a second polarizer of optical absorption type 13 arranged on another surface side of the Faraday rotator 11, the second polarizer 13 having a metal particle layer in which metal particles are distributed in a density higher than the density of metal particles distributed in the metal particle layer of the first polarizer 12. The optical isolator 1 makes it possible to reduce a deterioration of isolation caused by occurring a reflected light reflected between the second polarizer 13 and the first polarizer 12.

18 Claims, 6 Drawing Sheets

OPTICAL ISOLATOR ELEMENT AND OPTICAL MODULE USING THE SAME

CROSS REFERENCE TO THE RELATED APPLICATIONS

The present application is a national stage of international application No. PCT/JP2010/054849, filed on Mar. 19, 2010, and claims the benefit of priority under 35 USC 119 to Japanese Patent Application No. 2009-073637, filed on Mar. 25, 2009 and Japanese Patent Application No. 2009-249355, filed on Oct. 29,2009, the entire contents of all of which are incorporated herein by reference.

TECHNICAL FIELD

The present invention relates to an optical isolator that blocks reflection return light to a light emitting element, and an optical module using the same. An optical module including a light emitting element mount thereon is used in an optical communication equipment, a light source for a sensor and the like.

BACKGROUND ART

An optical isolator element includes a, Faraday rotator, and a first polarizer and a second polarizer sandwiching therebetween the Faraday rotator. The optical isolator element transmits light in a first direction (hereinafter referred to as light in a forward direction) as it is, and blockings light in a second direction opposite to the first direction (hereinafter referred to as light in a backward direction). There also exists, as the optical isolator element, a multi-layered type optical isolator element that is constituted by sequentially arranging a first polarizer, a first Faraday rotator, a second polarizer, a second Faraday rotator and a third polarizer, and has the same function.

Commonly, an absorption type polarizer is used in such polarizer that constitutes an optical isolator element. The absorption type polarizer is obtained by forming a crystal of a halide of copper, silver or cadmium in glass, uniaxially drawing the crystal by heating, and reducing the drawn crystal in a hydrogen atmosphere thereby precipitating a needle-shaped metal particle in the glass (see, for example, JP-A-08-50205).

However, in the optical isolator element using such polarizer, it is impossible to increase the concentration of a metal halide in the glass to a given concentration or higher. Therefore, in order to obtain requisite extinction-ratio characteristics, it is necessary to increase the thickness of a layer in which metal particles are distributed. Usually, a metal particle layer is distributed from a surface of a polarizer to the depth of 50 μm. The amount of metal particles is ensured by increasing the distribution depth, and thus desired extinction-ratio characteristics are obtained. Therefore, there is a problem that it is difficult for this type of a polarizer to decrease the thickness.

When the polarizer has a large thickness, there is a problem that an optical isolator element cannot be downsized. In case of light beam wherein a spot size of incident light is gradually increased, when the pot size increases more than that of the optical isolator element, there arises vignetting in wherein ambient light in the spot is blocked, resulting in optical loss. Therefore, it was required to sufficiently increase the size of the optical isolator element more than the spot size. Accordingly, there was a problem that it is difficult to miniaturize the optical isolator element.

There also exists, as the absorption type polarizer, a absorption type polarizer having a polarization function obtained by embedding metal particles on a glass surface using a physical vapor deposition method such as sputtering, and drawing the metal particle-embedded glass thereby orienting the glass (for example, JP-A-09-178939).

When an optical isolator element is produced using this type of a polarizer, the distribution depth of metal particles from the glass surface can be decreased and thus the thickness of the polarizer can be decrease. In compensation therefor, in order to obtain desired extinction-ratio characteristics, it is necessary to endure the amount of metal particles by increasing the metal particle density of the glass surface.

However, when the density of metal particles on glass surface is increased, a refractive index on the glass surface increases and light reflections may be sometimes caused by a difference in the refractive index. In this case, for example, as shown in FIG. 9, it is assumed that light 91 in a backward direction is incident on an optical isolator element 60 from a first polarizer 62 side. While light 91 in a backward direction is blocked by a second polarizer 63, reflected light 92 reflected partially at an interface 63a having a high metal particle density of the second polarizer 63 may sometimes reflect again at the interface 62a having a high metal particle density of first polarizer 62, and emit outside from the second polarizer 63 side as outgoing light 93. Since light in a backward direction is partially transmitted through the optical isolator element 60 in this way, there arises a problem that isolation characteristics deteriorate.

SUMMARY OF THE INVENTION

Under these circumstances, an object of the present invention is to provide an optical isolator element that causes less deterioration of isolation characteristics and is easily thinned.

An optical isolator element according to an embodiment of the present invention includes a Faraday rotator that rotates a polarization plane of light, a first polarizer arranged on one surface side of the Faraday rotator, and a second polarizer arranged on another surface side of the Faraday rotator. The first polarizer and the second polarizer are optical absorption type polarizers that include a metal particle layer in which metal particles are distributed. The second polarizer includes a metal particle layer in which metal particles are distributed in the density higher than that of metal particles distributed in the metal particle layer of the first polarizer.

In an optical isolator element according to an embodiment of the present invention, first, second and third polarizers of optical absorption type, each including a metal particle layer in which metal particles are distributed, a first Faraday rotator arranged between the first and second polarizers, and a second Faraday rotator arranged between the second and third polarizers are arranged in-line. The density of metal particles, that are distributed in the metal particle layer of any one of the first, second and third polarizers, is higher than that of metal particles distributed in the metal particle layer of the other polarizer.

In an optical isolator element according to an embodiment of the present invention, first, second and third polarizers of optical absorption type, each including a metal particle layer in which metal particles are distributed, a first Faraday rotator arranged between the first and second polarizers, and a second Faraday rotator arranged between the second and third polarizers are arranged in-line. The density of metal particles, that are distributed in the metal particle layer of the first and third polarizers, is higher than that of metal particles distributed in the metal particle layer of the second polarizer.

An optical module according to an embodiment of the present invention includes a light emitting element and, any one of the aforementioned optical isolator elements is inserted into an optical path of light signal emitted from the light emitting element.

An optical isolator element according to an embodiment of the present invention has a constitution that a density of metal particles in a metal particle layer, that are distributed in any one of polarizers opposed to each other through a Faraday rotator, is lower than that of metal particles of a metal particle layer distributed in the other polarizer, where making it possible to suppress reflected light from occurring in one polarizer, and thus deterioration of isolation of an optical isolator element can be reduced.

EMBODIMENTS FOR CARRYING OUT THE INVENTION

The respective Examples of embodiments of the present invention will be described in detail below with reference to the accompanying drawings.

Figure 1:
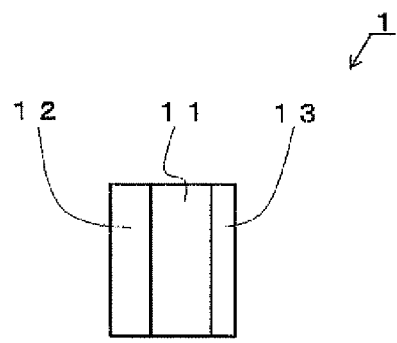
FIG. 1 is a side view showing an example of an embodiment of an optical isolator element of the present invention.

An optical isolator 1 according to an embodiment of the present invention is shown in FIG. 1. An optical isolator 1 has a structure in which a first polarizer 12 and a second polarizer 13 are arranged on one surface or another surface of a Faraday rotator 11. The respective elements 11, 12, 13 are respectively have a plate shape with a given thickness and are arranged in parallel. The Faraday rotator 11, and the first polarizer 12 and second polarizer 13 arranged on both sides thereof are integrally adhered and fixed using an adhesive. An adhesive having the same refractive index as that of elements 11, 12, 13 is suited as the adhesive. An acrylic or epoxy-based thermocurable adhesive, a UV-curable adhesive, and a combination type adhesive of both adhesives are used. As a matter of course, the other transparent medium, that is not the adhesive, may be arranged through air or the like.

It is possible to use, as the Faraday rotator 11, bismuth (Bi) substituted garnet Faraday rotator containing terbium (Tb), gadolinium (Gd) or holmium (Ho) added therein, or YIG garnet Faraday rotator, and a self-bias type Faraday rotator that does not require magnet. On a surface of the Faraday rotator 11, for example, an antireflection film composed of a multi-layered film such as titania ($TiO_2$) and silica ($SiO_2$) or tantalum pentoxide ($Ta_2O_5$) and $SiO_2$ may be formed. The use of such antireflection film enables adjustment of the amount of reflection of light on a surface of the Faraday rotator 11 to 0.2% or less. The thickness of the Faraday rotator 11 is adjusted to the thickness so that a Faraday rotation angle becomes, for example, 45° according to the kind of the material of the Faraday rotator 11 and the wavelength of light to be used. Specifically, the thickness varies depending on the kind of the material and the wavelength to be used, and is from 0.2 to 0.5 mm. The Faraday rotator is arranged so that a transmittance polarization plane of the first polarizer 12 and that of the second polarizer 13 mutually form an angle of 45° to light in a forward direction.

The absorption type polarizer includes type A and type B absorption type polarizers. The first polarizer 12 of the optical isolator element 1 is a type A polarizer in which the density of metal particles distributed in a metal particle layer included in a surface or inner layer is lower than the density of metal particles distributed in a metal particle layer included in a surface or inner layer of the second polarizer 13. In contrast, the second polarizer 13 is a type B polarizer in which the density of metal particles distributed in a metal particle layer included in a surface or inner layer is higher than the density of metal particles distributed in a metal particle layer included in a surface or inner layer of the first polarizer 12.

While FIG. 1 shows an example in which the first polarizer 11 is arranged on the left side of the Faraday rotator 11 and the second polarizer 13 is arranged on the right side, it is all the same even when the polarizer is reversely arranged. The optical isolator element 1 is an optical isolator element in which a type A polarizer is arranged on any one surface of the Faraday rotator 11 and a type B polarizer is arranged on another surface. Alternatively, it is an optical isolator element in which the type A polarizer and the type B polarizer are oppositely arranged while interposing the Faraday rotator 11 therebetween.

Figure 10A:
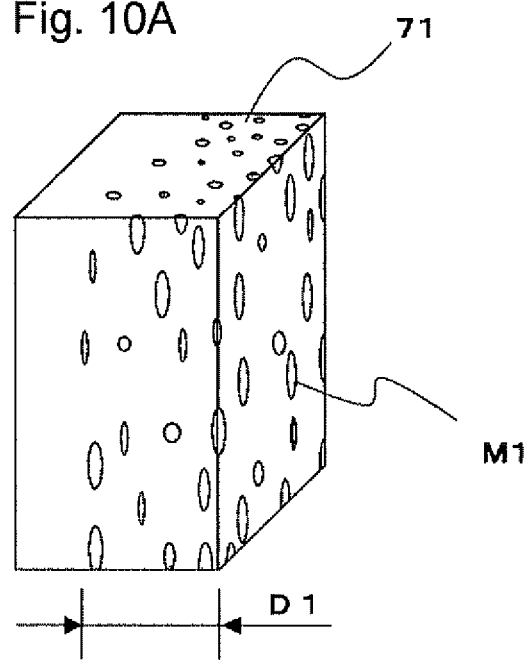
FIG. 10A is a perspective view schematically showing an example of a type A absorption type polarizer.
Figure 10B:
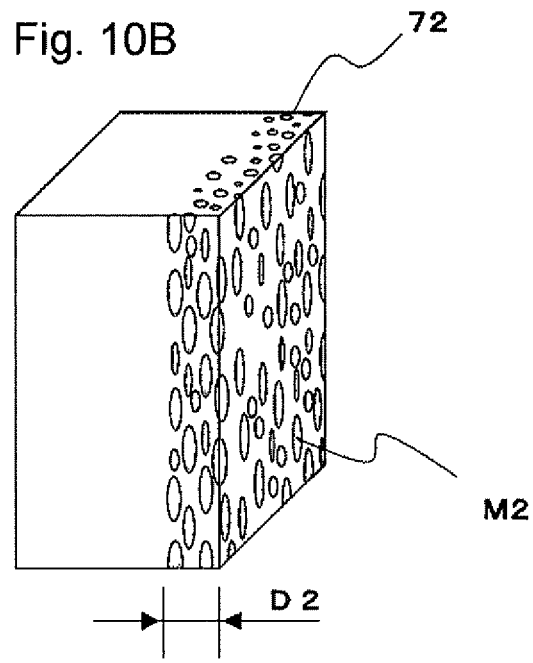
FIG. 10B is a perspective view schematically showing a type B absorption type polarizer.

FIG. 10A is a perspective view schematically showing a type A polarizer, and FIG. 10B is a perspective view schematically showing a type B polarizer. In the type A polarizer and type B polarizer, metal particles M1, M2 are scattered inside the polarizer near the surface. Some metal particles M1, M2 have an elongate shape with a major axis in a uniaxial direction (a vertical direction in FIG. 10A and FIG. 10B) of the polarizer. In the type A polarizer shown in FIG. 10A, metal particles M1 are scattered in a metal particle layer 71 at depth D1. In the type B polarizer shown in FIG. 10B, metal particles M2 are scattered in a metal particle layer 72 at depth D2.

While FIG. 10A and FIG. 10B show an example in which metal particle layers 71, 72 are formed in the vicinity of the surface of the polarizer, the metal particle layers 71, 72 may be formed inside the polarizer. In this case, the density of metal particles M1, M2 becomes the highest density inside the polarizer. Herein, depths D1, D2 of metal particle layers 71, 72 are defined by thicknesses of the metal particle layers 71, 72 in which the existence of metal particles M1, M2 is confirmed by cross-sectional observation using TEM.

As shown in FIG. 10A and FIG. 10B, the thickness D2 of the metal particle layer 72 distributed in a surface or inner layer of the type B polarizer is ½ or less of the thickness D1 of the metal particle layer 71 of the type A polarizer. In the type A polarizer, the distribution density of metal particles M1 distributed in a surface or inner layer is lower than that in the type B polarizer, and the distribution thickness D1 of metal particles M1 distributed is larger than the distribution thickness D2 of the type B polarizer.

In the type A polarizer, first, halide crystals of copper (Cu), silver (Ag), cadmium (Cd) or the like are formed in glass such as quartz glass. The glass and halide crystals are softened by heating and then heat-reduced in a hydrogen atmosphere while uniaxially drawing, together with glass, to precipitate metal particles M1 on the glass surface. In the drawing step, the halide crystal is partially converted into a uniaxially oriented needle-shaped crystal and then reduced to form needle-shaped metal particles M1.

In this type A polarizer, the halide crystal surface or metal particles M1 formed inside the halide crystal are distributed from a polarizer surface to the depth of 20 μm or more. However, since metal particles M1 have low distribution density, a refractive index of the surface layer is almost the same level as in a base material (n=1.46 in case of quartz glass). Since metal particles M1 have low distribution density, the refractive index inside the polarizer becomes almost a given value and the reflectance of a polarizer becomes almost a stable reflectance such as about 4% against air. It is possible to adjust the reflectance to less than 0.5% by providing the surface with an AR coating composed of a multi-layered film such as $TiO_2/SiO_2$ or $Ta_2O_5/SiO_2$. However, metal particles M1 have a large distribution depth D1 and are therefore unsuited for the purpose of producing a thin polarizer. Specifically, the thickness of the type A polarizer is within a range from 0.1 to 1 mm.

The type B polarizer exerts a polarization function when metal particles M2 are embedded on a surface of a base material such as glass using sputtering, heated and uniaxially drawn, together with glass, thereby uniaxially orienting needle-shaped metal particles M2. The polarizer has a feature that no halide is contained in glass, and the metal particles M2 are distributed in a range from the glass surface to 10 μm at most. In metal particles M2, metal such as copper or silver is used, similarly to the type A polarizer.

In the type B polarizer, since metal particles M2 in the vicinity of a surface of a base material have high density against light in a blocking polarization direction (including a polarization plane in a direction to be blocked, a refractive index increases and, regarding a reflectance of the polarizer against an air layer, the reflectance of about 4 to 15% is generated. Against light in the blocking polarization direction, even when a surface is provided with AR coating, the reflectance of about 0.5 to 11% is generated. Against light in a transmission polarization direction (including a polarization plane to be transmitted), metal particles M2 transmit light. The refractive index becomes a given value, that is almost the same level as in glass of a base material, and the reflectance becomes a stable reflectance such as about 4% against air. In this case, it becomes possible to adjust to the reflectance of less than about 0.5% by providing the surface with AR coating. When distribution density of metal particles M2 on the surface of the base material is decreased, since an extinction-ratio of the polarizer deteriorates, the polarizer becomes unsuitable as a polarizer to be used in an optical isolator element 1. This type B polarizer is suitable for the purpose of producing a thin polarizer since metal particles M2 concentratedly exist on the surface of the base material. Specifically, the thickness of the type B polarizer can be produced in a range from 0.03 μm to 1 mm.

It is possible to confirm the distribution density of metal particles M1, M2 by observing a cross section, formed by slicing the polarizer, using TEM. The kind of metal of the observed metal particles M1, M2 can be specified using EDS (energy dispersive X-ray analysis). The depth, where it becomes impossible to observe metal particles M1, M2 from the surface of the base material, is regarded as a distribution depth. Since the type B polarizer include no metal atom inside the base material, it is also possible to examine the distribution depth by an elemental analyzer such as XPS (X-ray photoelectron spectrometry analysis). The type A polarizer includes a metal halide, that is not precipitated as metal particles M1, M2, in the base material, and therefore it is difficult to specify the distribution depth by analysis using XPS.

The type A polarizer has a feature that metal particles entirely have low density but have a large distribution depth, and are distributed up to the depth of about 50 μm. In contrast, the type B polarizer has a feature that metal particles have high distribution density in the vicinity of a surface but have small distribution depth, and metal particles concentratedly exist in the vicinity of a surface of a depth of 10 μm at most. The absorption type polarizer includes a layer containing metal particles formed on surfaces of both sides of the polarizer so as to improve extinction-ratio characteristics. In case of the type A polarizer, since metal particles have a large distribution depth, it is more difficult to make the polarizer thin when a metal particle layer is formed on both surfaces.

As described above, the distribution depth of metal particles of the type B polarizer is ½ or less of the depth of the type A polarizer. It is possible to improve deterioration of isolation characteristics by producing an optical isolator element 1 using both types of polarizers in combination. This is described with reference to FIG. 4.

Figure 4A:
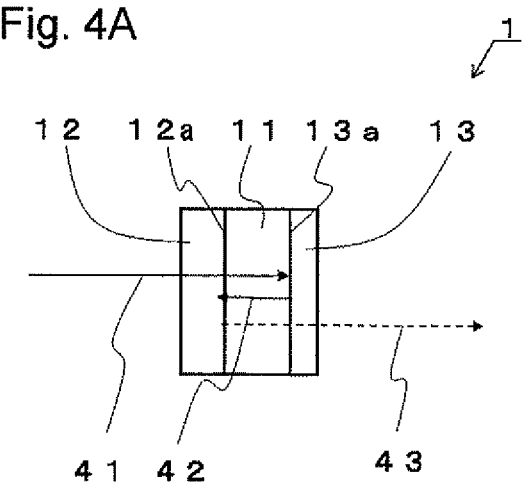
FIG. 4A is a schematic view showing an aspect of light transmitted through an optical isolator element according to an embodiment of the present invention.

FIG. 4A is an aspect in which a type A polarizer is used as a first polarizer 12 and a type B polarizer is used as a second polarizer 13. When incident light 41 in a backward direction is incident, incident light 41 partially reflects on a metal particle layer 13a having a high refractive index of a second polarizer 13 to generate reflected light 42. However, since the first polarizer 12 does not include a layer having a high refractive index, reflected light 43 by the first polarizer 12 is scarcely generated. Actually, a reflectance on a surface 12a of the type A first polarizer 12 is 0.5% or less, and reflected light 43, that exerts an influence on isolation characteristics, is less likely to be generated. Since reflected light 42 will go and return in the Faraday rotator 11, most of the reflected light is absorbed by the first polarizer 12.

Figure 4B:
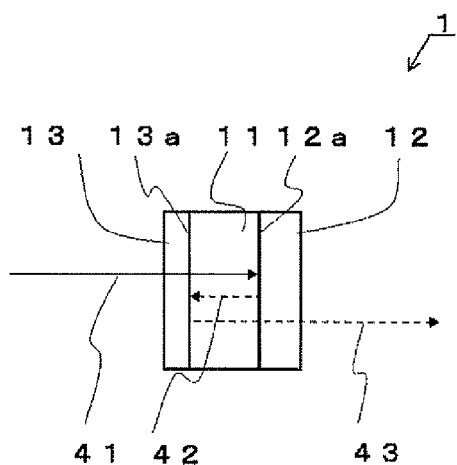
FIG. 4B is a schematic view showing an aspect of light transmitted through an optical isolator element according to an embodiment of the present invention.

As shown in FIG. 4B, when incident light 41 in a backward direction is incident from the side of the second polarizer 13, the type A first polarizer 12 does not include a layer having a high refractive index. Therefore, incident light 41 in a backward direction scarcely generate reflected light 42 on a metal particle layer 12a of the first polarizer 12. Accordingly, even when reflected light 42 reflects on the metal particle layer 12*a* of the second polarizer 12, reflected light 43 is scarcely generated and thus it is less likely to cause deterioration of isolation characteristics.

Such the optical isolator element 1 according to an embodiment of the present invention can be used in a state where a plurality of these optical isolator elements are laid one upon another, thus making it possible to further improve isolation characteristics. An example of an optical isolator 2 using in a state where a plurality of these optical isolator elements are laid one upon another will be described with reference to FIG. 2A, FIG. 2B and FIG. 2C.

Figure 2A:
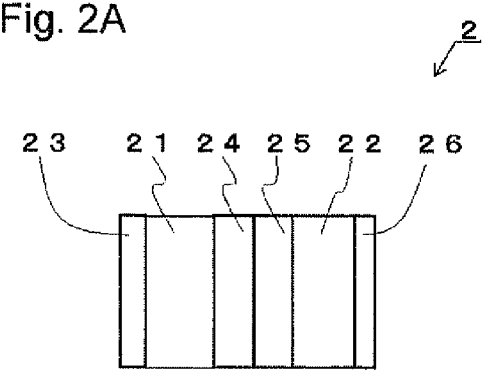
FIG. 2A is a side view showing an example of another embodiment using the optical isolator element of FIG. 1.
Figure 2B:
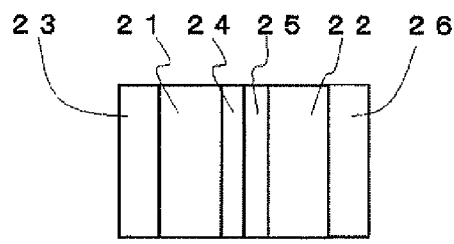
FIG. 2B is a side view showing an example of another embodiment using the optical isolator element of FIG. 1.
Figure 2C:
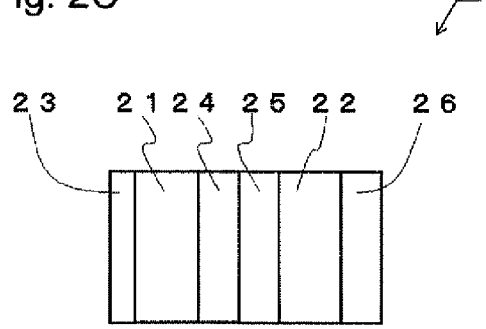
FIG. 2C is a side view showing an example of another embodiment using the optical isolator element of FIG. 1.

An optical isolator element 2 of FIG. 2A shows an example in which a type B polarizer is used as a first polarizer 23 and a fourth polarizer 26, and a type A polarizer is used as a second polarizer 24 and a third polarizer 25. An optical isolator element 2 of FIG. 2B shows an example in which a type A polarizer is used as a first polarizer 23 and a fourth polarizer 26, and a type B polarizer is used as a second polarizer 24 and a third polarizer 25. An optical isolator element 2 of FIG. 2C shows an example in which a type B polarizer is used as a first polarizer 23, and a type A polarizer is used as a second polarizer 24, a third polarizer 25 and a fourth polarizer 26. The reference characters 21 and 22 in FIG. 2A, FIG. 2B and FIG. 2*c* indicate a first Faraday rotator and a second Faraday rotator respectively.

It is desired that a lot of type B polarizers are used as much as possible for the purpose of decreasing the thickness of the optical isolator element 2. As shown in FIG. 2C, it is possible to use an optical isolator element 1 according to an embodiment of the present invention and a conventional type optical isolator element including a type A polarizer arranged on both sides thereof in a state of being laid one upon another. It is necessary for the second polarizer 24 and the third polarizer 25 to lay one upon another in the same direction so that polarization directions of these polarizers are the same.

While an example, in which optical isolators of FIG. 1 are used in combination in a state where optical isolators are laid one upon another in two stages, was shown in FIG. 2A, FIG. 2B and FIG. 2C, it is also possible to use optical isolators in combination in a state where optical isolators are laid one upon another in three or more stages. While all examples, in which optical isolators of FIG. 1 are used in combination in a multi-layered state, are not shown in FIG. 2A, FIG. 2B and FIG. 2C, there is no particular limitation on a laying method and the other lamination method can also be used. For example, a type B polarizer may be used as a first polarizer 23 and a third polarizer 25, and a type A polarizer may be used as a second polarizer 24 and a fourth polarizer 26.

Next, the optical isolator element 3 according to another embodiment of the present invention will be described with reference to accompanying drawings of FIG. 3A and FIG. 3B.

In the optical isolator element 3 of the present embodiment, two Faraday rotators are used. As compared with optical isolator elements 2 shown in FIG. 2A, FIG. 2B and FIG. 2C, isolation decreases. However, there are merits that it is possible to obtain isolation characteristics which are sufficiently excellent as compared with an optical isolator element 1 shown in FIG. 1, and to perform thinning as compared with the optical isolator elements 2 shown in FIG. 2A, FIG. 2B and FIG. 2C.

The optical isolator element 3 of the present embodiment is provided with a structure that a first polarizer 33, a first Faraday rotator 31, a second polarizer 34, a second Faraday rotator 32 and a third polarizer 35 are arranged in-line and these components are laminated and fixed. The respective elements 33, 31, 34, 32, 35 are arranged in parallel. It is possible to use, as the first Faraday rotator 31 and the second Faraday rotator 32, the rotator that is the same as the Faraday rotator 11 shown in FIG. 1. Then, the second polarizer 34 is arranged at an angle of 45° to a transmittance polarization plane of the first polarizer 33, against light in a forward direction, and third polarizer 35 is arranged at an angle of 45° to a transmittance polarization plane of the second polarizer 34.

Figure 3A:
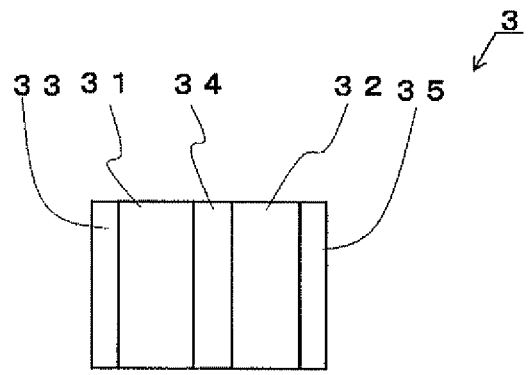
FIG. 3A is a side view showing another example of an embodiment of an optical isolator element of the present invention.

The optical isolator element 3 of FIG. 3A shows an example in which a type B polarizer is used as the first polarizer 33 and the third polarizer 35, and a type A polarizer is used as the second polarizer 34. The optical isolator element 2 of FIG. 3B shows an example in which a type A polarizer is used as the first polarizer 33 and the third polarizer 35, and a type B polarizer is used as the second polarizer 34. It is possible to use, as the optical isolator element 3, both of examples of FIG. 3A and FIG. 3B.

Figure 3B:
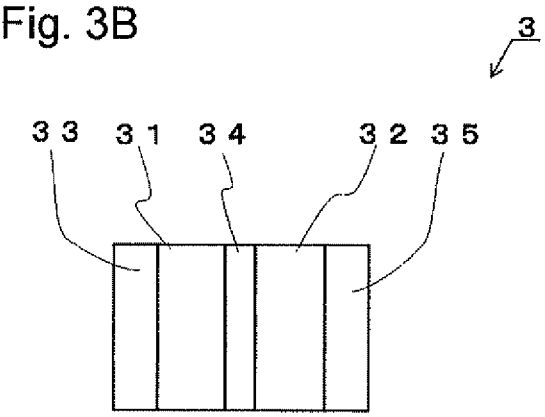
FIG. 3B is a side view showing another example of an embodiment of an optical isolator element of the present invention.

While an example in which a type B polarizer is arranged as the second polarizer 34 was show in the example of FIG. 3B, when one type B polarizer is used, the type B polarizer is not limited to the second polarizer 34 and may be used as any one of the first, second and third polarizers 33, 34, 35. As described above, any one polarizer of the first, second and third polarizers 33, 34, 35 may be a type B polarizer having a high metal particle density distributed in a metal particle layer.

The constitution of FIG. 3A is preferred since a thinner optical isolator element 3 can be produced. Isolation characteristics of the optical isolator element 3 will be described with reference to FIG. 5.

Figure 5A:
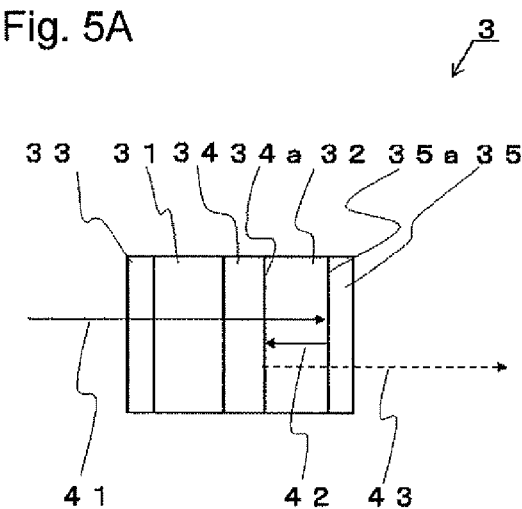
FIG. 5A is a schematic view showing an aspect of light transmitted through an optical isolator element according to an embodiment of the present invention.

FIG. 5A shows a case where the optical isolator element 3 of FIG. 3A is used. Reflected light 42 reflected on a metal particle layer 35*a* of a type B third polarizer 35 is generated against incident light 41 in a backward direction. Since the polarizer 34 is a type A polarizer, reflected light 42 scarcely reflects on the metal particle layer 34*a* and thus a small amount of reflected light 43 reflects on the metal particle layer 34*a* of the second polarizer 34. Since reflected light 42 will go and return in the second Faraday rotator 32, a polarization direction has rotated by 90° when returned to the second polarizer 34, and a small amount of light transmits through the second polarizer 34 to reach the first polarizer 33. Accordingly, reflected light 43 emitted from an optical isolator element 3 does not cause deterioration of isolation characteristics.

Figure 5B:
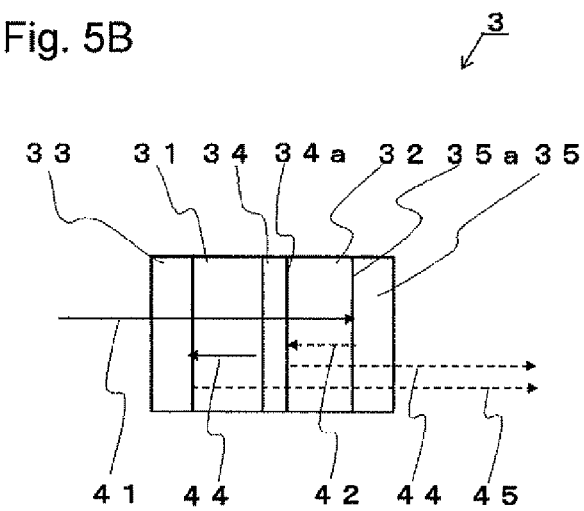
FIG. 5B is a schematic view showing an aspect of light transmitted through an optical isolator element according to an embodiment of the present invention.

The optical isolator element 3 of FIG. 5B shows the case where the optical isolator element 3 of FIG. 3B is used. Since the third polarizer 35 is a type A polarizer, incident light 41 in a backward direction scarcely reflects on the metal particle layer 35*a* and thus a small amount of reflected light 42 is generated. Also, since the first polarizer 33 is a type A polarizer, reflected light 44 generated on the surface of the second polarizer 34 scarcely reflects on the first polarizer 33 and a small amount of reflected light 45 is generated. Accordingly, the amount of reflected light 44 and reflected light 45 are generated and do not cause deterioration of isolation characteristics. While a type B polarizer was used as the second polarizer 34 in FIG. 3B, it is possible to obtain the same effect even when the type B polarizer is used as the first polarizer 33 or the third polarizer 35.

Figure 6:
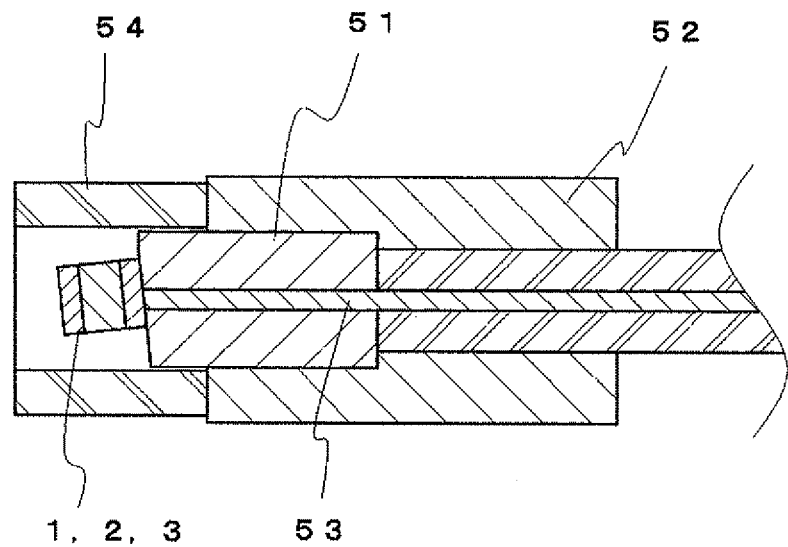
FIG. 6 is a sectional view showing an example of an optical fiber holding component using an optical isolator element according to an embodiment of the present invention.

FIG. 6 is a sectional view schematically showing an example in which an optical fiber holding component, equipped with an optical isolator element, which constitutes a portion of an optical module is formed, using optical isolator elements 1, 2, 3. In this optical fiber holding component equipped with optical isolator elements 1, 2, 3, a ferrule 51 holding an optical fiber 53 is held by a holding member 52. A tip surface of the ferrule 51 is subjected to mirror polishing oblique to an optical axis. Any one of optical isolator elements 1, 2, 3 is fixed to the tip surface of the ferrule 51 using an adhesive or the like. For example, an optical module is constituted by using the optical fiber holding component shown in FIG. 6 as a light output portion or the like of a package including a light emitting element (not shown) mounted thereon, and inserting optical isolator 1, 2, 3 into an optical path of light signal emitted from a light emitting element. The symbol 54 denotes a magnet arranged outside the optical isolators 1, 2, 3.

As described above, when the light signal emitted from the light emitting element is converged by lens or the like and this converged light beam is made incident on the tip of the optical fiber 53, the arrangement of the optical isolator element 1 may be selected according to the use application of the optical module. That is, the optical isolator 1 may be arranged so that a type A polarizer 12 is arranged on a tip surface of the ferrule 51 and a type B polarizer 13 is arranged on the opposite side.

This will be described with reference to FIG. 7. Converged light beam 55 from the light emitting element is set so that the beam is focused in the vicinity of the tip portion of the optical fiber 53. When optical module is a pump laser module used in an optical fiber amplifier and a light source output is large output light of several tens mW to several hundreds mW class, it is preferred to arrange the optical isolator element 1 so that a diameter of light beam that transmits through the type B second polarizer 13 having a higher metal particle density becomes larger than the light beam diameter of the type A first polarizer 12 having a small metal particle density. That is, it is preferred that the type B second polarizer 13 is arranged on the side of the light emitting element and the type A first polarizer 12 is arranged on the side of the tip surface of the ferrule 51. When arranged in this way, it is advantageous since the type B second polarizer 13 having a small thickness of the metal particle layer and having low light resistance as compared with the type A first polarizer is arranged on the side of the beam diameter having a low energy density.

Also, reflection return light returned from the side of the ferrule 51 is incident on the first polarizer 12 at a beam diameter 55 that is almost the same level as a mode field diameter of an optical fiber 53. When reached the second polarizer 13, since the beam diameter is enlarged and increases, the energy density of beam in the second polarizer 13 becomes lower than the density in the first polarizer 12. The type B polarizer has high density of metal particles of the surface and beam is absorbed by the metal particle layer of the surface as compared with the type A polarizer, and tends to be locally overheated and thus it has low light resistance. Therefore, it is preferred to use the type B polarizer as the second polarizer 13 on the side where the beam diameter increases.

Figure 7:
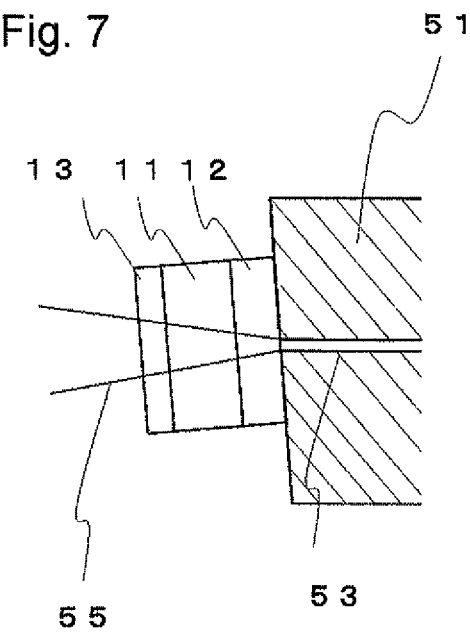
FIG. 7 is a main part enlarged sectional view showing an example of an optical fiber holding component using an optical isolator element according to an embodiment of the present invention.

While a description was made using the optical isolator element 1 of FIG. 1 in FIG. 7, it is the same even in optical isolator elements 2, 3 of FIG. 2A, FIG. 2B, FIG. 2C, FIG. 3A and FIG. 3B, and a type B polarizer may be arranged on the side where the beam diameter is more large. While a description was made about an optical fiber holding component in this description, when used against an optical receptacle and also an optical isolator is constituted of the optical isolator element alone, light resistance can be improved by arranging the type B polarizer on the side where the energy density of beam is low, similarly.

Figure 8:
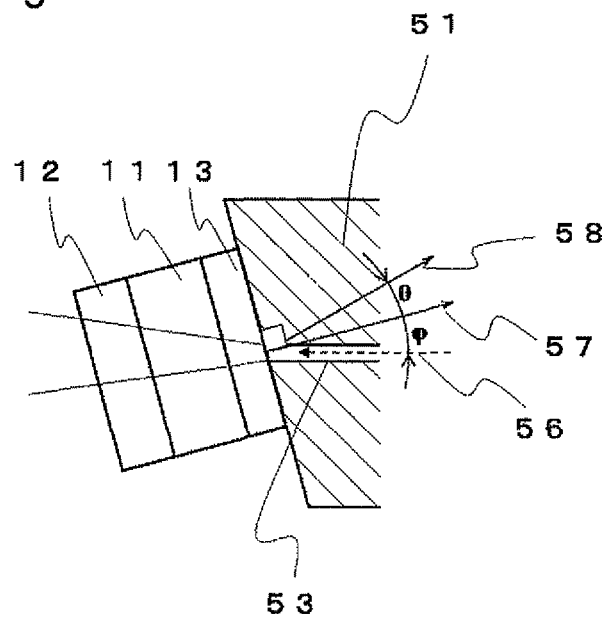
FIG. 8 is a main part enlarged sectional view showing another example of an optical fiber holding component using an optical isolator element according to an embodiment of the present invention.
Figure 9:
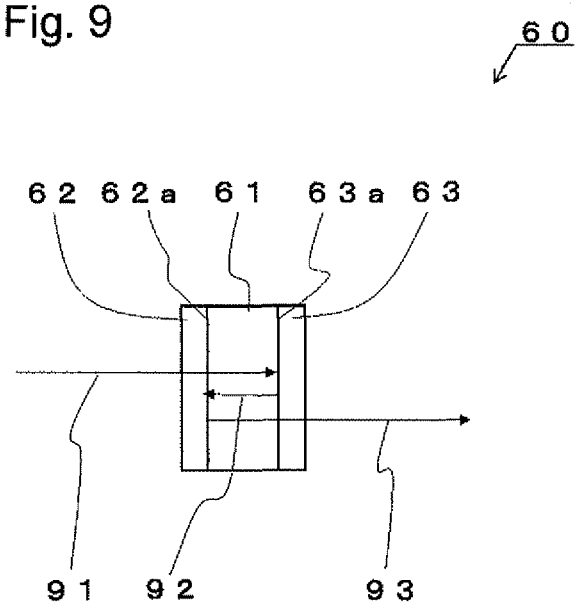
FIG. 9 is a schematic view showing an aspect of light in a backward direction transmitted through a conventional optical isolator element.

On the other hand, when the optical module performs direct modulation using an optical modulator at particularly high speed of about 10 Gb/s to 40 Gb/s, regarding the arrangement of the optical isolator 1, it is preferred that the type B second polarizer 13 is arranged on the tip surface of the ferrule 51 and type A first polarizer 12 is arranged on the opposite side, as shown in FIG. 8.

Among the reflection return light 56 returned from the side of the ferrule 51, a light component in a blocking polarization direction is once absorbed to the metal particle layer of the polarizer and then converted into heat, and is partially reradiated as heat radiation light 57. At this time, since the radiation direction extends over a wide range including mainly a normal direction of the polarizer, when the light component is partially bonded again to the optical fiber 53, noise occurs against light signal.

When the second polarizer 13 is a type B polarizer, a light component in a blocking polarization direction among the reflection return light 56 returned from the side of the ferrule 51 side partially reflects on the metal particle layer 13a having a high refractive index to generate reflected light 58. At this time, since a reflection angle θ is equal to an incidence angle φ to the second polarizer 13, it has a large angle to the optical fiber 53. Therefore, it is difficult for this reflected light 58 to bond with the optical fiber 53. Also, the non-reflected light component in the blocking polarization direction is adsorbed to the metal particle layer and then partially radiated as heat radiation light 57. Since the amount of light to be absorbed to metal particles of the second polarizer 13 decreases by the amount reflected as reflected light 58, radiation light 57 generated by absorption also decreases. Therefore, the intensity of light bonded again with the optical fiber 53 decreases and also a noise component against light signal decreases.

Since a distance between the optical fiber 53 and the metal particle layer 13a increases by arranging the metal particle layer 13a of the second polarizer 13 on the side of the Faraday rotator 11, it becomes difficult for the radiation light 57 generated at the metal particle layer 13a to be bonded by the optical fiber 53, and also noise against light signal more decreases.

In case an optical fiber holding component equipped with an optical isolator element shown in FIG. 6 is constituted, when optical isolator elements 1, 2, 3 are fixed to an end face of the optical fiber 53, that would be a focus of converged light beam, in this way, light radiated from a light emitting element (not shown) such as a semiconductor laser is converged through a lens (not shown) and optical isolator elements 1, 2, 3 are arranged on the place where a spot size of light decreases. Therefore, there is an advantage that the size of optical isolator elements 1, 2, 3 can be decreased. When thin optical isolator elements 1, 2, 3 according to the embodiment of the present invention are used, it is possible to further provide optical fiber holding component that is miniature and is excellent in isolation characteristics.

Next, Example of an optical isolator element 3 of the embodiment shown in FIG. 3A is shown. The optical isolator element 3 shown in FIG. 3A was made by the following procedure.

As the first Faraday rotator 31 and the second Faraday rotator 32, a 0.45 mm thick Faraday rotator made of bismuth substituted garnet $((BiR)_3Fe_5O_{12})$ was used. A type A polarizer was used as the second polarizer 34, and a type B polarizer was used as the first polarizer 33 and the third polarizer 35.

A type A polarizer used was produced by the following procedures. Using a glass base material $SiO_2$ and $B_2O_3$, a halide crystal of silver formed in glass was oriented by drawing with heating and then reduced in a hydrogen atmosphere to obtain a polarizer having a thickness of 200 μm. A distribution depth of metal particles (silver particles) precipitated in the vicinity of a surface was 50 μm.

A type B polarizer used was produced by the following procedures. Using the same glass base material $SiO_2$ and $B_2O_3$, silver particles formed in glass by sputtering were drawn while heating to obtain a polarizer having a thickness of 80 μm. A distribution depth of silver particles in the vicinity of a surface was 5 μm.

These elements were optically aligned, bonded using a combination type adhesive of UV curable and thermocurable adhesive, and then cut into a rectangle with a size of 0.5 mm in width, 0.6 mm in depth using a dicing machine to produce an optical isolator element 1.

Next, a conventional optical isolator element was produced as Comparative Example 1. The same Faraday rotators as the aforementioned Faraday rotators 31, 32 were used as the first Faraday rotator and the second Faraday rotator, and the same type A polarizer as the aforementioned second polarizer 34 was used as the first polarizer, the second polarizer and the third polarizer. These components were cut into size measuring 0.5 mm×0.6 mm by a dicing machine to produce a conventional optical isolator element.

Furthermore, the same type B polarizer as in the aforementioned first polarizer 33 was used as a first polarizer, a second polarizer and a third polarizer to produce an optical isolator element as Comparative Example 2.

Then, the thickness and isolation characteristics of the optical isolator element 2, and optical isolator elements of Comparative Example 1 and Comparative Example 2 were measured. Isolation characteristics were measured by the following procedure. That is, the respective optical isolator elements were inserted into a collimator optical system having a wavelength of 1,550 nm and a beam diameter of 0.3 mm in the direction opposite to a light transmission direction, and then the output light intensity was measured by a power meter. Evaluation was carried out every each optical isolator element. The results are shown in Table 1.

TABLE 1

|  | Thickness [mm] | Isolation [dB] |
|---|---|---|
| The present invention | 1.266 | 62.3 |
| Comparative Example 1 | 1.508 | 61.8 |
| Comparative Example 2 | 1.145 | 19 |

As shown in Table 1, a thickness is 1.508 mm and isolation characteristics are 61.8 dB in Comparative Example 1, a thickness is 1.145 mm and isolation characteristics are 19 dB in Comparative Example 2, whereas, a thickness is 1.266 mm and isolation characteristics are 62.3 dB in the optical isolator element 2 according to an embodiment of the present invention. It could be confirmed that isolation characteristics of the optical isolator element 2 according to an embodiment of the present invention bears comparison with the optical isolator element of Comparative Example 1 and isolation characteristics are noticeably improved as compared with Comparative Example 2. It was also confirmed that miniaturization could have been achieved.

As is apparent from the above, according to the respective embodiments of the present invention, it is possible to obtain an optical isolator element 3, that does not cause deterioration of isolation characteristics, by using a type B polarizer as a pair of a first polarizer 33 and a third polarizer 35 of an optical isolator element 2 provided with first polarizer of optical absorption type 33, second polarizer 34 and third polarizer 35 arranged in-line, a first Faraday rotator 31 arranged between the first polarizer 33 and the second polarizer 34, and a second Faraday rotator 32 arranged between the second polarizer 34 and the third polarizer 35, and using a type A polarizer as the second polarizer 34. Whereby, the optical isolator element 3 can also be miniaturized.

The present invention is not limited to the aforementioned embodiments and Examples, and various modifications can be made without departing from the scope of the present invention. For example, while $SiO_2$ and $B_2O_3$ were used as a glass base material of a polarizer in an example of the aforementioned embodiments, the other oxide-based glass material such as $Al_2O_3$ may also be used.

In the description of the aforementioned embodiments, the term "up and down/left and right" was merely used for describing a positional relation on the drawing, and dos not mean the positional relation upon actual use.

NUMERICAL REFERENCES 1, 2, 3: Optical isolator element
11: Faraday rotator
31: First Faraday rotator
32: Second Faraday rotator
12, 33: First polarizer
13, 34: Second polarizer
35: Third polarizer
51: Ferrule
52: Capillary
53: Optical fiber
54: Magnet

The invention claimed is:

1. An optical isolator element comprising:
a Faraday rotator that rotates a polarization plane of light;
a first polarizer arranged on one surface side of the Faraday rotator, the first polarizer having a metal particle layer in which metal particles are distributed; and
a second polarizer arranged on another surface side of the Faraday rotator, the second polarizer having a metal particle layer in which metal particles are distributed in a density higher than the density of metal particles distributed in the metal particle layer of the first polarizer.

2. The optical isolator element according to claim 1, wherein a thickness of the metal particle layer of the first polarizer is thicker than a thickness of the metal particle layer of the second polarizer.

3. The optical isolator element according to claim 1, wherein a thickness of the metal particle layer of the first polarizer is two or more times as large as a thickness of the metal particle layer of the second polarizer.

4. The optical isolator element according to claim 1, wherein the first polarizer is a polarizer in which the metal particles formed by reducing metal halide included in a vicinity of surface of a glass substrate are formed in an elongated shape by extending the substrate, and wherein the second polarizer is a polarizer in which the metal particles included in the metal particle layer are formed in an elongated shape by depositing with physical vapor deposition a dielectric material and a metal on a transparent substrate to form a dielectric layer and the metal particle layer and then extending the substrate.

5. An optical isolator element in which a plurality of the optical isolators according to claim 1 are laminated.

6. An optical module comprising:
a light emitting element; and
the optical isolator element according to claim 1, the optical isolator element being inserted into an optical path over which a light signal emitted from the light emitting element is transmitted.

7. The optical module according to claim 6,
wherein the optical isolator element is inserted on a way over which a converged light beam emitted from the light emitting element is transmitted and arranged so that a diameter of light beam that is transmitted through the first polarizer is larger than a diameter of light beam that is transmitted through the second polarizer.

8. An optical isolator element comprising:
first, second and third polarizers of optical absorption type arranged in-line, each including a metal particle layer in which metal particles are distributed;
a first Faraday rotator arranged between the first and second polarizers; and
a second Faraday rotator arranged between the second and third polarizers,
wherein a density of metal particles, that are distributed in the metal particle layer of any one of the first, second and third polarizers, is higher than those densities of the metal particles distributed in the metal particle layers of the other polarizers.

9. The optical isolator element according to claim 8,
wherein a thickness of the metal particle layer of one of the first, second and third polarizers is smaller than those of the metal particle layers of the other polarizers.

10. The optical isolator element according to claim 8,
wherein a thickness of the metal particle layer of one of the first, second and third polarizers is half or less those of the metal particle layers of the other polarizers.

11. The optical isolator element according to claim 8,
wherein any one of the first, second and third polarizers is a polarizer in which the metal particles included in the metal particle layer are formed in an elongated shape by depositing with physical vapor deposition a dielectric material and a metal on a transparent substrate to form a dielectric layer and the metal particle layer and then extending the substrate, and wherein the other polarizers are a polarizer in which metal particles that metal halide in a vicinity of surface of a glass substrate is heat-reduced are formed in an elongated shape by extending the substrate.

12. An optical module comprising:
a light emitting element; and
the optical isolator element according to claim 8, the optical isolator element being inserted into an optical path over which a light signal emitted from the light emitting element is transmitted.

13. The optical module according to claim 12,
wherein the optical isolator element is inserted on a way over which the converged light beam emitted from the light emitting element is transmitted and arranged so that a diameter of the light beam that is transmitted through said any one of the first, second and third polarizers is larger than those of the light beam that is transmitted through the other polarizers.

14. An optical isolator element comprising:
first, second and third polarizers of optical absorption type arranged in-line, each including a metal particle layer in which metal particles are distributed;
a first Faraday rotator arranged between the first and second polarizers; and
a second Faraday rotator arranged between the second and third polarizers,
wherein densities of metal particles that are distributed in the metal particle layers of the first and third polarizers are higher than a density of metal particles distributed in the metal particle layer of the second polarizer.

15. The optical isolator element according to claim 14,
wherein each of thicknesses of the metal particle layers in the first and third polarizers is smaller than that of the metal particle layer in the second polarizer.

16. The optical isolator element according to claim 14,
wherein each of thicknesses of the metal particle layers in the first and third polarizers is half or less that of the metal particle layer in the second polarizer.

17. The optical isolator element according to claim 14,
wherein the first and third polarizers are a polarizer in which the metal particles included in the metal particle layer are formed in an elongated shape by depositing with physical vapor deposition a dielectric material and a metal on a transparent substrate to form a dielectric layer and the metal particle layer and then extending the substrate, and wherein the second polarizer is a polarizer in which the metal particles formed by reducing metal halide included in a vicinity of surface of a glass substrate are formed in an elongated shape by extending the substrate.

18. An optical module comprising:
a light emitting element; and
the optical isolator element according to claim 14, the optical isolator element being inserted into an optical path over which a light signal emitted from the light emitting element is transmitted.

* * * * *